（12） United States Patent
Stoica-Beck et al.

(10) Patent No.: US 10,114,858 B2
(45) Date of Patent: *Oct. 30, 2018

(54) MACHINE-ASSISTED OBJECT MATCHING

(71) Applicant: Maana, Inc., Palo Alto, CA (US)

(72) Inventors: Alina Mihaela Stoica-Beck, Bellevue, WA (US); Jason Forrest Mackay, Sammamish, WA (US)

(73) Assignee: Maana, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,030

(22) Filed: Jan. 29, 2018

(65) Prior Publication Data

US 2018/0150506 A1 May 31, 2018

Related U.S. Application Data

(63) Continuation of application No. 15/595,612, filed on May 15, 2017, now Pat. No. 9,881,053.

(Continued)

(51) Int. Cl.
*G06F 17/30* (2006.01)
*G06F 17/27* (2006.01)

(52) U.S. Cl.
CPC ........ *G06F 17/30389* (2013.01); *G06F 17/27* (2013.01); *G06F 17/2705* (2013.01);
(Continued)

(58) Field of Classification Search
None
See application file for complete search history.

(56) References Cited

U.S. PATENT DOCUMENTS 6,917,952 B1 7/2005 Dailey et al.
7,966,270 B2 * 6/2011 Bhagwan .......... G06F 17/30067
706/12

(Continued)

OTHER PUBLICATIONS

Bahmani, A.H., et al., Automatic Database Normalization and Primary Key Generation, CCECE/CCGEI, Niagara Fails, Canada, May 5-7, 2008, 6 pages.

(Continued)

*Primary Examiner* — Hung D Le
(74) *Attorney, Agent, or Firm* — John W. Branch; Lowe Graham Jones PLLC

(57) ABSTRACT

Embodiments are directed towards managing data using modeling platform. A principal data set and match data set may be provided. The principal data set may include principal objects and the match data set may include other model objects. Blocking may associate each of the plurality of principal objects with potential match objects. Principal objects from the plurality of principal objects may be selected based on heuristics, their associated potential match objects, or the like. Potential match objects may be labeled as a true match or a non-match with respect to their associated principal object. A ranker may be trained to identify top-ranked matches based on the labeled potential match objects. The trained ranker may be employed to indicate matches where each matching other model object is a potential match object that is ranked higher than other potential match objects that are associated with its matched principal object.

20 Claims, 9 Drawing Sheets

Related U.S. Application Data

(60) Provisional application No. 62/336,463, filed on May 13, 2016.

(52) U.S. Cl.
CPC .. *G06F 17/30292* (2013.01); *G06F 17/30309* (2013.01); *G06F 17/30554* (2013.01); *G06F 17/30646* (2013.01)

(56) References Cited

U.S. PATENT DOCUMENTS

| | | | |
|---|---|---|---|
| 8,099,415 B2* | 1/2012 | Luo | G06F 17/30569 707/736 |
| 8,156,056 B2 | 4/2012 | Mateos | |
| 9,311,676 B2* | 4/2016 | Helitzer | G06Q 40/08 |
| 9,460,390 B1* | 10/2016 | Lin | G06N 5/04 |
| 2003/0225742 A1 | 12/2003 | Tenner et al. | |
| 2005/0034042 A1 | 2/2005 | Davies et al. | |
| 2005/0055369 A1 | 3/2005 | Gorelik et al. | |
| 2008/0065427 A1* | 3/2008 | Helitzer | G06Q 40/08 705/4 |
| 2008/0250064 A1* | 10/2008 | Duchon | G06Q 30/02 |
| 2010/0262625 A1* | 10/2010 | Pittenger | G06F 17/30525 707/783 |
| 2010/0313157 A1 | 12/2010 | Carlsson et al. | |
| 2014/0108433 A1 | 4/2014 | Conner | |
| 2014/0280343 A1 | 9/2014 | Georges et al. | |
| 2015/0286713 A1* | 10/2015 | Zhang | G06F 17/30734 707/749 |
| 2016/0034486 A1 | 2/2016 | Dageville et al. | |
| 2016/0335302 A1 | 11/2016 | Teodorescu et al. | |
| 2017/0034018 A1 | 2/2017 | Parandehgheibi et al. | |
| 2017/0206557 A1* | 7/2017 | Abrol | G06Q 30/0261 |
| 2017/0235915 A1* | 8/2017 | Mansi | G06F 19/3418 705/3 |

OTHER PUBLICATIONS

Chattopadhyay, I., et al., Data Smashing. Discovery Informatics Papers, AAAI, Cornell University, Ithaca, New York, 2014, 8 pages.

Ilyas, I., et al., Automatic Relationship Discovery in Self-Managing Database Systems, Proceedings of the International Conference on Autonomic Computing, 2004, 2 pages.

Heule, S., et al., A. HyperLogLog in Practice: Algorithmic Engineering of a State of the Art Cardinality Estimation Algorithm, EDBT/ICDT, Genoa, Italy, Mar. 18-22, 2013, 10 pages.

Marcus, R., et al., An Efficient Algorithm and Monte Carlo Methods for Inferring Functional Dependencies, Doctoral Defense, Department of Philosophy, University of Arizona, May 26, 2014, 11 pages.

Pascoe, A., HyperLogLog and Minhash: A Union for Intersections, AdRoll, Apr. 25, 2013, 37 pages.

Sailhan, F., et al., Folding and Unfolding Bloom Filters—An off-Line Planning and on-Line Optimisation, IEEE, SRI International, Menlo Park, California, 2012, 8 pages.

Salikhov, K., et al., Using Cascading Bloom Filters to Improve the Memory Usage for de Brujin Graphs, 2013, 13 pages.

Cochinwala, M., et al., Efficient data reconciliation, Telcordia Technologies Inc., Information Sciences 137 (2001) 1-15, accepted Oct. 20, 2000, 15 pages.

Dorneles, C., et al., Approximate data instance matching: a survey, Knowl Inf Syst (2011) 27:1-21, published Apr. 9, 2010.

Herbrich, R., et al., Large Margin Rank Boundaries for Ordinal Regression, Technical University of Berlin, Mar. 26, 2000, 18 pages.

Apache Mahout, Canopy Clustering, https://mahout.apache.org/users/clustering/canopy-clustering.html, 4 pages.

Arasu, A., et al., On Active Learning of Record Matching Packages, SIGMOND' 10, Indianapolis, Indiana, Jun. 6-11, 2010, 12 pages.

Baxter, R., et al., A Comparison of Fast Blocking Methods for Record Linkage, CMIS Technical Report 03/139, First Workshop on Data Cleaning, Record Linkage and Object Consolidation, KDD 2003, Washington DC, Aug. 24-27, 2003, 6 pages.

Bellare, K., et al., Active Sampling for Entity Matching, Technical Report, Stanford InfoLab, Apr. 13, 2012, 9 pages.

Beygelzimer, A., et al., Agnostic Active Learning without Constraints, NIPS' 10 Proceedings of the 23rd International Conference on Neural Information Processing Systems, Vancouver, British Columbia Dec. 6-9, 2010, 17 pages.

Bilenko, M., et al., Adaptive Blocking: Learning to Scale Up Record Linkage, Proceedings of the 6th IEEE International Conference on Data Mining (ICDM-06), pp. 87-96, Hong Kong, Dec. 2006.

Bilenko, M., et al., Adaptive Duplicate Detection Using Learnable String Similarity Measures, Proceedings of the Ninth ACM SIKDD International Conference on Knowledge Discovery and Data Mining (KDD-2003), Washington, D.C., pp. 39-48, Aug. 2003.

Burges, C., et al., Learning to Rank using Gradient Descent, Proceedings of the 22nd International Conference on Machine Learning, Bonn, Germany, 2005, 8 pages.

Burges, C., et al., Learning to Rank with Nonsmooth Cost Functions, published in Advances in Neural Information Processing Systems 19, Jan. 1, 2007, 8 pages.

Christen, P., Automatic Training Example Selection for Scalable Unsupervised Record Linkage, Proceedings of the 12th Pacific-Asia Conference on Advances in Knowledge Discovery and Data Mining PAKDD 2008, Osaka, Japan, May 20-23, 2008, 12 pages.

Cohen, D., et al., Improving Generalizations with Active Learning, Machine Learning, vol. 15, Issue 2, 201-221, May 1994.

Elfeky, M., et al., TAILOR: A Record Linkage Toolbox, Proceedings of the 18th International Conference on Data Engineering, San Jose, California, Feb. 26-Mar. 1, 2002, 12 pages.

Freund, Y., et al., Selective Sampling Using the Query by Committee Algorithm, Machine Learning, vol. 28, Issue 2, pp. 133-168, Aug. 1997.

Joachims, T., Optimizing Search Engines using Clickthrough Data, KDD '02 Proceedings of the eigth ACM SIGKDD International Conference on Knowledge Discovery and Data Mining, Jul. 23-26, 2002, Edmonton, Alberta, Canada, 10 pages.

Kopcke, H.; et al., Evaluation of entity resolution approaches on real-world match problems, Proceedings of the VLDB Endowment, vol. 3, Issue 1-2, Sep. 2010, 10 pages.

McCallum, A., et al., Efficient Clustering of High-Dimensional Data Sets with application to Reference Matching, KDD '00 Proceedings of the sixth ACM SIGKDD International Conference on Knowledge Discovery and Data Mining, Boston Massachusetts, Aug. 20-23, 2000, 10 pages.

Sarawagi, S., et al., Interactive Deduplication using Active Learning, KDD '02 Proceedings ofhte eithe ACM SIGKDD International Conference on Knowledge Discovery and Data Mining, Edmonton, Alberta, Canada, Jul. 23-26, 2002, 10 pages.

Tejada, S., et al., Learning Domain-Independent String Transformation Weights for High Accuracy Object Identification, Eight ACM SIGKDD International Conference of Knowledge Discovery and Data Mining, Edmondton, Alberta, Canada, Jul. 23-26, 2002, 10 pages.

Zheng, Z., et al., A General Boosting Method and its Application to Learning Ranking Functions for Web Search, NIPS '07 Proceedings of the 20th International Conference on Neural Information Processing Systems, Vancouver, British Columbia, Canada, Dec. 3-6, 2007, 8 pages.

International Search Report for International Application No. PCT/US2017/032737 dated Jul. 24, 2017, 13 pages.

Official Communication for U.S. Appl. No. 15/595,612 dated Nov. 22, 2017, 9 pages.

Official Communication for U.S. Appl. No. 15/595,612 dated Jul. 12, 2017, 6 pages.

\* cited by examiner

MACHINE-ASSISTED OBJECT MATCHING

CROSS-REFERENCE TO RELATED APPLICATIONS

This Utility Patent Application is a Continuation of U.S. patent application Ser. No. 15/595,612 filed on May 15, 2017, now U.S. Pat. No. 9,881,053 issued on Jan. 30, 2018, which is based on previously filed U.S. Provisional Patent Application Ser. No. 62/336,463 filed on May 13, 2016, entitled "RANKMATCH: A DATA EFFICIENT RECORD MATCHING ALGORITHM," the benefit of the filing dates of which are claimed under 35 U.S.C. § 120 and § 119(e), and the contents of which are each further incorporated in entirety by reference.

TECHNICAL FIELD

This invention relates generally to information organization and data modeling and more particularly, to characterizing data objects for searching and analysis.

BACKGROUND

Organizations are generating and collecting an ever increasing amount of data. Data may be directly or indirectly generated from disparate parts of the organization, such as, consumer activity, manufacturing activity, customer service, quality assurance, or the like. For various reasons, it may be inconvenient for such organizations to effectively utilize their vast collections of data. In some cases the quantity of data may make it difficult to effectively utilize the collected data to improve business practices. In other cases, the data collected by different parts of an organization may be stored in different formats, stored in different locations, organized arbitrarily, or the like. Further, employees within the organization may not be aware of the purpose or content of the various data collections stored throughout the organization. Accordingly, it may be difficult to discover relevant relationships such as matches of records in distinct data sets. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
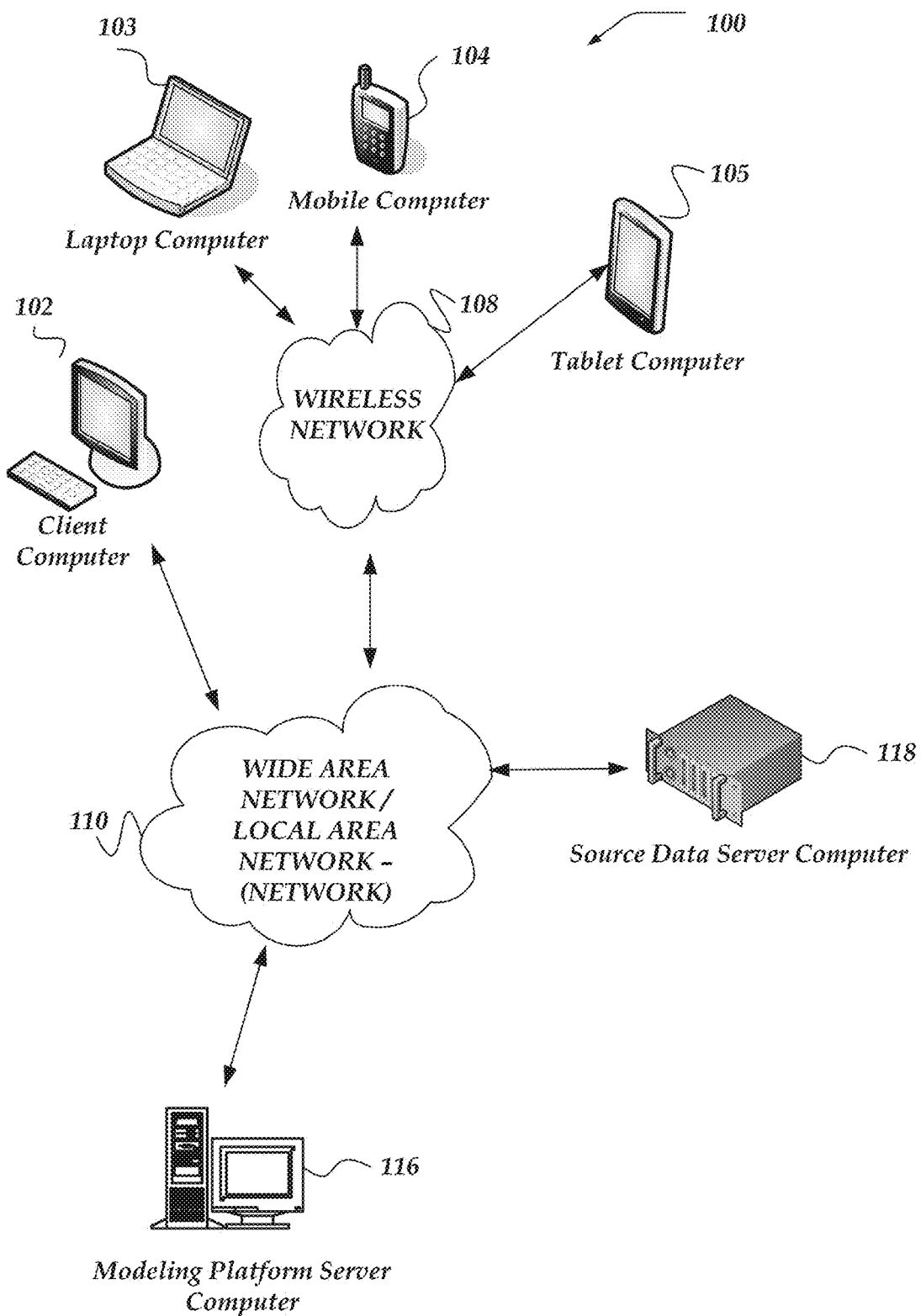
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "raw data set," or "data set" refer to data sets provided by an organization that may represent the items to be included in a system model. In some embodiments raw data may be provided in various formats. In simple cases, raw data may be provided in spreadsheets, databases, csv files, or the like. In other cases, raw data may be provided using structured XML files, tabular formats, JSON files, models information from one or more other system models, or the like. In one or more of the various embodiments, raw data in this context may be the product one or more preprocessing operations. For example, one or more pre-processing operations may be executed on information, such as, log files, data dumps, event logs, database dumps, unstructured data, structured data, or the like, or combination thereof. In some cases, the pre-processing may include data cleansing, filtering, or the like. The pre-processing operations, if any, may occur before the information may be considered to be raw data. The particular pre-processing operations may be specialized based on the source, context, format, veracity of the information, access opportunities, or the like. In most cases, raw data may be arranged such that it may be logically viewed as comprising one or more objects, tables, having one or more identifiable fields and/or columns, or the like.

As used herein, the terms "raw data objects," or "data objects" refer to objects or tables that comprise raw datasets. For example, if a dataset is comprised of a plurality of tabular record set, the separate tabular record sets may be considered data objects. A data object may be arranged to include one or more records having one or more fields.

As used herein, the term "model object" refers to an object that models various characteristics of a data object. Model objects may include one or more model object fields that include one or more attributes (e.g., model field attributes) that represent features or characteristics of their corresponding data object fields. Accordingly, while a data object may have thousands or millions of records, its corresponding model object may be arranged to include model object fields that include attributes describing one or more characteristics of their underlying data object fields rather than thousands or millions of records.

As used herein, the terms "blocking" or "blocking techniques" refer to data processing technique to identify or group objects or records that may be potential matches to each other. Blocking techniques employ approximations to efficiently exclude obvious non-matches from consideration. Accordingly, more computationally expensive matching processes may be performed on objects or records considered to be potential matches rather than having to be applied to all objects or records in a set. Blocking identifies groups of objects that are near in similarity to each other, for some definition of near. Blocking may be accomplished using various well-known clustering or indexing techniques, such as, canopy clustering, bigram indexing, standard/traditional blocking, sorted neighborhood blocking, or the like. Blocking is an area of active research and development. Thus, other or additional blocking techniques may be employed as they become available.

As used herein, the term "ranker" refers to a specialized classifier object that was produced via a learning to rank algorithm. Herein, a ranker may be trained to pair-wise rank the similarity of two or more objects to another object. A ranker may be employed by a ranking engine to rank the similarity of potential matching objects or records to a given principal object or record. Learning to rank is a well-studied problem and several approaches have been researched and developed. Accordingly, various learning to rank processes may be employed to generate rankers used by a ranking engine, such as, RankSVM, RankNET, GBRank, LambdaRank, or the like. Given a principal object and a set of potential matching objects, a ranker may be trained to rank the potential matching objects in order of their computed similarity scores.

As used herein, the terms "classifier," "classic classifier" refers to a machine-learning classifier that is configured or trained to categorize (or classify) objects or records. Here, a classic classifier or classifier is considered to be a classifier other than a ranker classifier. For example, a classic classifier may be a match/non-match classifier arranged and trained to predicate (e.g., guess) if two objects are a match or non-match. Classifiers may be produced using various well-known machine-learning techniques, such as, decision trees, artificial neural networks, linear regression, deep learning algorithms, or the like.

As used herein, the terms "principal model object," or "principal object" refer to model objects for which matching objects are being sought. For example, a modeling platform may be arranged to discover matching objects for a principal model object. A modeling platform that supports record matching may be arranged to iterate through a set of model objects, where in turn each model object is considered a principal model object while the modeling platform searches for its matching objects.

As used herein, the terms "potential match model object," or "potential match object" refer to a model object that has been determined to be a potential match for a given principal model object. For example, a blocking process may be employed to identify potential match model objects.

As used herein, the term "principal data set" refers to data sets that include principal model objects or raw data that may be transformed into principal model objects. This term is used for convenience to distinguish between data sets where objects in set A are intended to be matched with model objects in set B. In some cases, either data set may be designated the principal data set.

As used herein, the term "match data set" refers to data sets that include model objects (or raw data that may be transformed into model objects) that are intended to be matched with principal model object in an associated principal data set. This term is used for convenience to distinguish between data sets where objects in principal data set (e.g., set A) are intended to be matched with model objects in another data set (e.g., set B). In some cases, either data set may be designated the principal data set as long as the other data set is considered the match data set.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing data using modeling platform. In one or more of the various embodiments, a principal data set and match data set may be provided to the modeling platform. In some embodiments, the principal data set may include a plurality of principal objects and the match data set may include a plurality of other model objects.

In one or more of the various embodiments, the modeling platform may employ a similarity engine to execute a blocking process that may associate each of the plurality of principal objects with one or more potential match objects selected from the plurality of other model objects.

In one or more of the various embodiments, the modeling platform may employ the similarity engine to provide one or more principal objects of the plurality of principal objects. In some embodiments, the one or more principal objects may be selected based on one or more heuristics and their associated potential match objects. In one or more of the various embodiments, providing the one or more principal objects may include selecting the principal model objects at random from a portion of the plurality of principal model objects, such that the portion of principal model objects may be associated with two or more potential match objects and one or more of the two or more potential match object have a similarity score that exceeds a threshold value.

In one or more of the various embodiments, one or more of the one or more potential match objects may be labeled as a true match or a non-match with respect to their associated principal object. In one or more of the various embodiments, labeling the one or more potential match objects may include: communicating each of the one or more principal objects and their associated potential match objects to a user; displaying each of the one or more principal objects and their associated potential match objects to the user; and enabling the user to identify a true match for the one or more principal data objects from among the displayed potential match objects.

In one or more of the various embodiments, the modeling platform may employ a ranking engine to train a ranker to identify a top-ranked potential match object for the one or more principal objects based on the labeled potential match objects.

In one or more of the various embodiments, the modeling platform may employ the ranking engine and the trained ranker to indicate matches among the plurality of principal objects and the plurality of other model objects. In some embodiments, each matching other model object may be a potential match object that may be ranked higher than other potential match objects that are associated with its matched principal object.

In one or more of the various embodiments, two or more data sets that include raw data may be provided to the modeling platform. In one or more of the various embodiments, the modeling platform may be arranged to transform the raw data into a plurality of model objects that may be included in one or more of the principal data set or the match data set. In one or more of the various embodiments, each model object has identical features.

In one or more of the various embodiments, the modeling platform may employ the similarity engine to train a secondary classifier to distinguish between true matches and non-matches based on the matches indicated by the ranking engine. In one or more of the various embodiments, the modeling platform may employ the secondary classifier to discover incorrect indications of matches that were provided by the ranking engine.

In one or more of the various embodiments, the modeling platform may be arranged to group the other model objects in the match data set with potential duplicate objects in the match data set. In some embodiments, one or more duplicate objects included in the match data set may be labeled as true matches or non-matches. In some embodiments, another ranker may be trained to rank potential duplicate objects based on their similarity to their respective principal duplicate object. In one or more of the various embodiments, the modeling platform may employ the other ranker to rank potential duplicate objects based on their similarity to their respective principal duplicate object, such that the top-ranked potential duplicate object may be indicated as a duplicate object. In some embodiments, another secondary classifier may be trained to discover duplicate objects that may be falsely indicated by the other ranker. In one or more of the various embodiments, the modeling platform may be arranged to discover duplicate model objects in the match data set based on the other ranker and the other secondary classifier. Accordingly, in some embodiments, the duplicate model objects may be removed or otherwise isolated from the plurality of other model objects.

In one or more of the various embodiments, the modeling platform may execute the similarity engine to provide a similarity score based on individual features of the one or more principal objects and each of their respective potential match objects.

In one or more of the various embodiments, the modeling platform may employ the similarity engine to provide a similarity score for each of the potential match objects, such that the similarity score may be arranged to indicate a measure of feature-based similarity between principal objects and their associated potential match objects.

In one or more of the various embodiments, the modeling platform may be arranged to distribute one or more instances of one or more of the similarity engine, the ranking engine, or an attribute engine, across two or more separate network computers, such that the one or more instances may execute in parallel or concurrently.

Illustrated Operating Environment

FIG. 1 shows components of one embodiment of an environment in which embodiments of the invention may be practiced. Not all the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, modeling platform server computer 116, one or more source data server computers 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), universally unique identifiers (UUIDs), or other device identifiers. Such information may be provided in a network packet, or the like, sent between other client computers, modeling platform server computer 116, one or more source data server computers 118, or other computers.

Client computers 102-105 may further be configured to include a client application that enables an end-user to log into an end-user account that may be managed by another computer, such as modeling platform server computer 116, one or more source data server computers 118, or the like. Such an end-user account, in one non-limiting example, may be configured to enable the end-user to manage one or more online activities, including in one non-limiting example, project management, software development, system administration, data modeling, search activities, social networking activities, browse various websites, communicate with other users, or the like. Also, client computers may be arranged to enable users to display reports, interactive user-interfaces, and/or results provided by modeling platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HS-DPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, modeling platform server computer 116, one or more source data server computers 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of modeling platform server computer 116 is described in more detail below in conjunction with FIG. 3. Briefly, however, modeling platform server computer 116 includes virtually any network computer that is specialized to provide data modeling services as described herein.

Although FIG. 1 illustrates modeling platform server computer 116 as a single computer, the innovations and/or embodiments are not so limited. For example, one or more functions of modeling platform server computer 116, or the like, may be distributed across one or more distinct network computers. Moreover, modeling platform server computer 116 is not limited to a particular configuration such as the one shown in FIG. 1. Thus, in one embodiment, modeling platform server computer 116 may be implemented using a plurality of network computers. In other embodiments, server computers may be implemented using a plurality of network computers in a cluster architecture, a peer-to-peer architecture, or the like. Further, in at least one of the various embodiments, modeling platform server computer 116 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
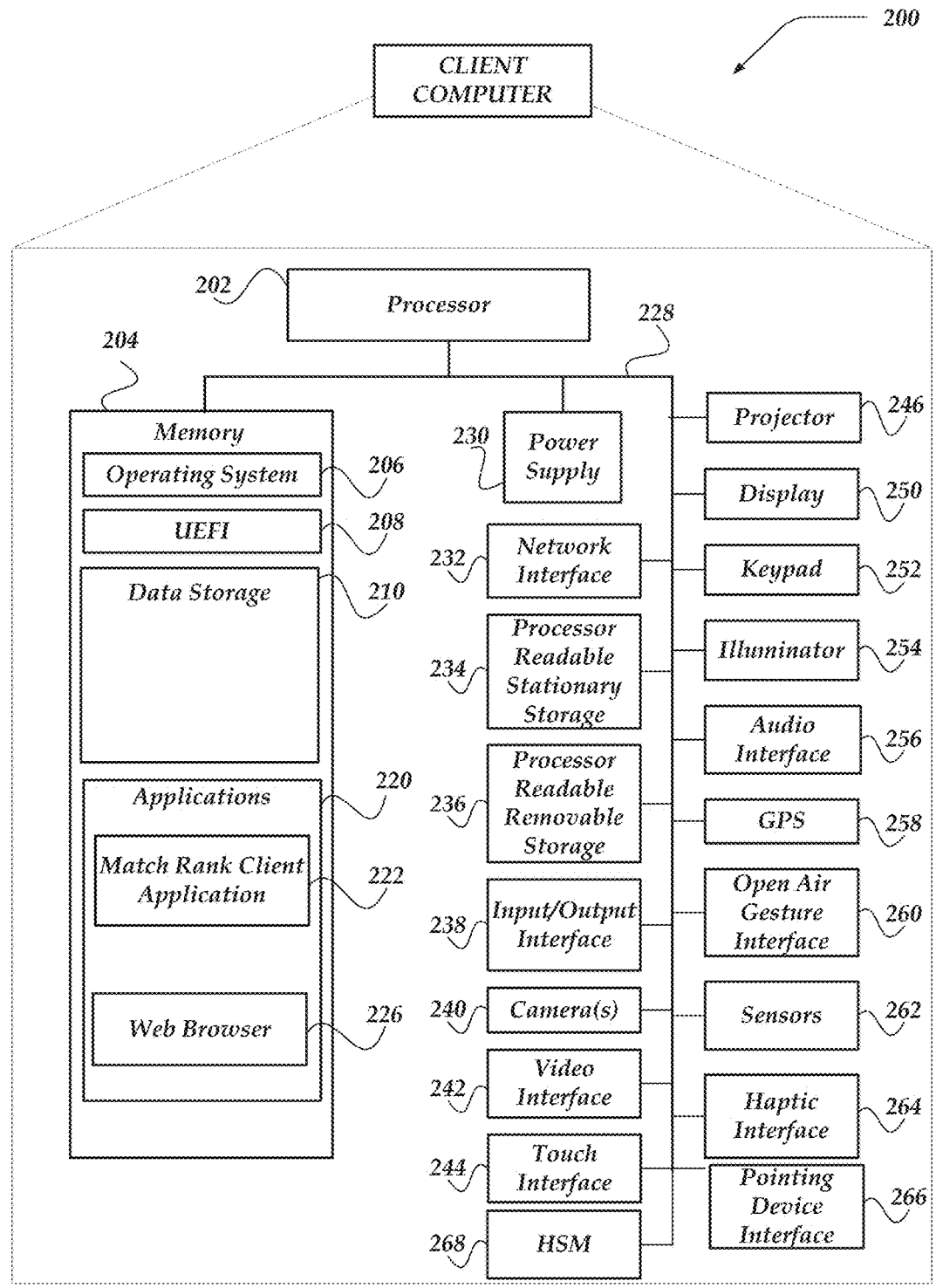
FIG. 2 shows a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include one or more processors, such as processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope, accelerometer, or the like may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, electronic paper, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, Bluetooth Low Energy. or the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, match rank client engine 222, web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™, Bluetooth Low Energy, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, user credentials, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, match rank client application 222. In at least one of the various embodiments, match rank client application 222 may be used to interact with a modeling platform.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

Figure 3:
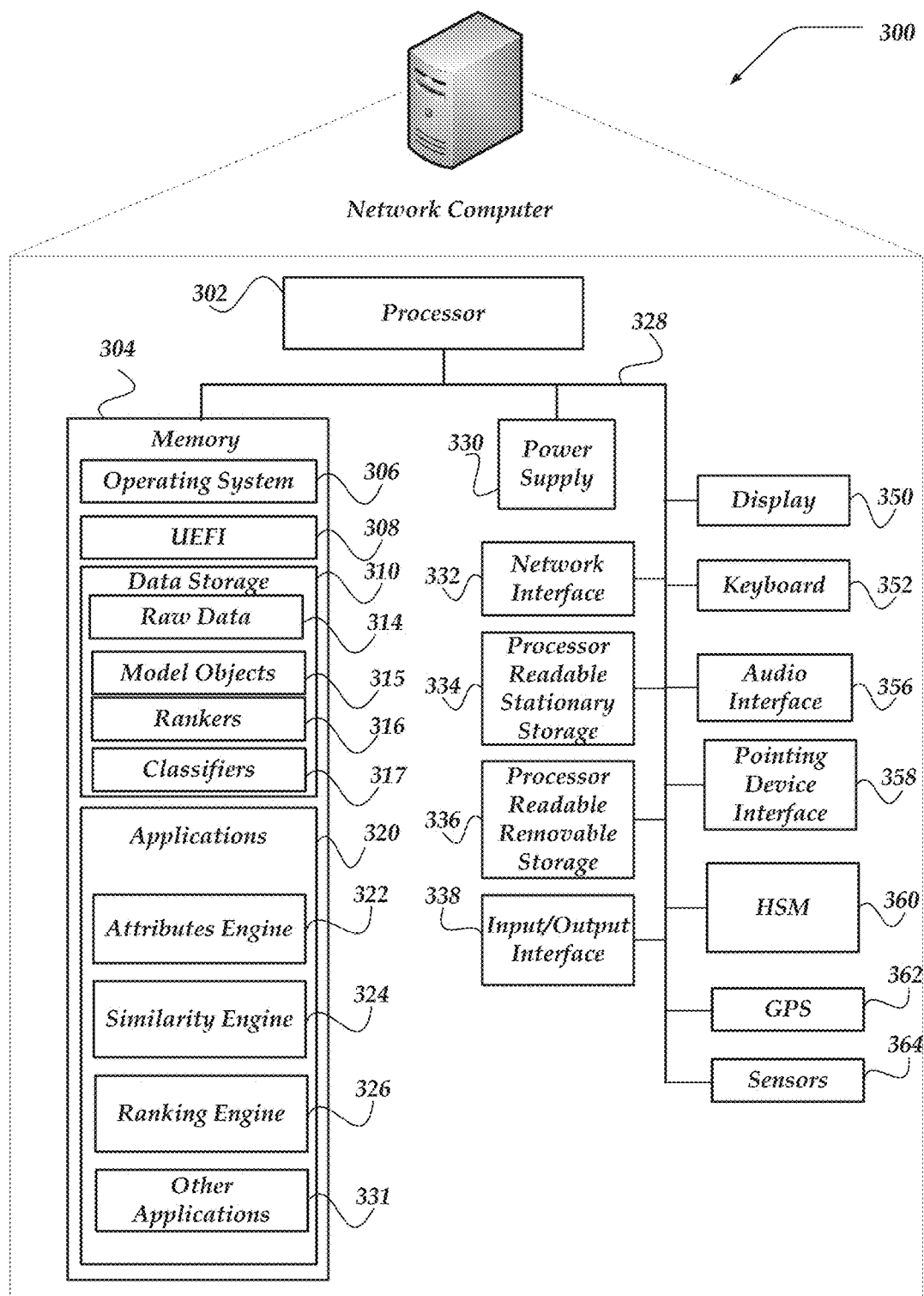
FIG. 3 illustrates a schematic embodiment of a network computer.

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 116 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300. In some embodiments, processor 302 may be a multiprocessor system that includes one or more processors each having one or more processing/execution cores.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a unified extensible firmware interface (UEFI) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by one or more processors, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, raw data 314, model objects 315, rankers 316, classifiers 317, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include attributes engine 322, similarity engine 324, ranking engine 326, other applications 331, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, attributes engine 322, similarity engine 324, ranking engine 326, other applications 331, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 362. Also, in some embodiments, geolocation information may include information provided using one or more geo-location protocols over the networks, such as, wireless network 108 and/or network 110.

Furthermore, in at least one of the various embodiments, attributes engine 322, similarity engine 324, ranking engine 326, other applications 331, may be operative in a cloud-based computing environment. In at least one of the various embodiments, these engines, and others, that comprise the modeling platform that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to attributes engine 322, similarity engine 324, ranking engine 326, other applications 331, may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

Illustrative Logical System Architecture

Figure 4:
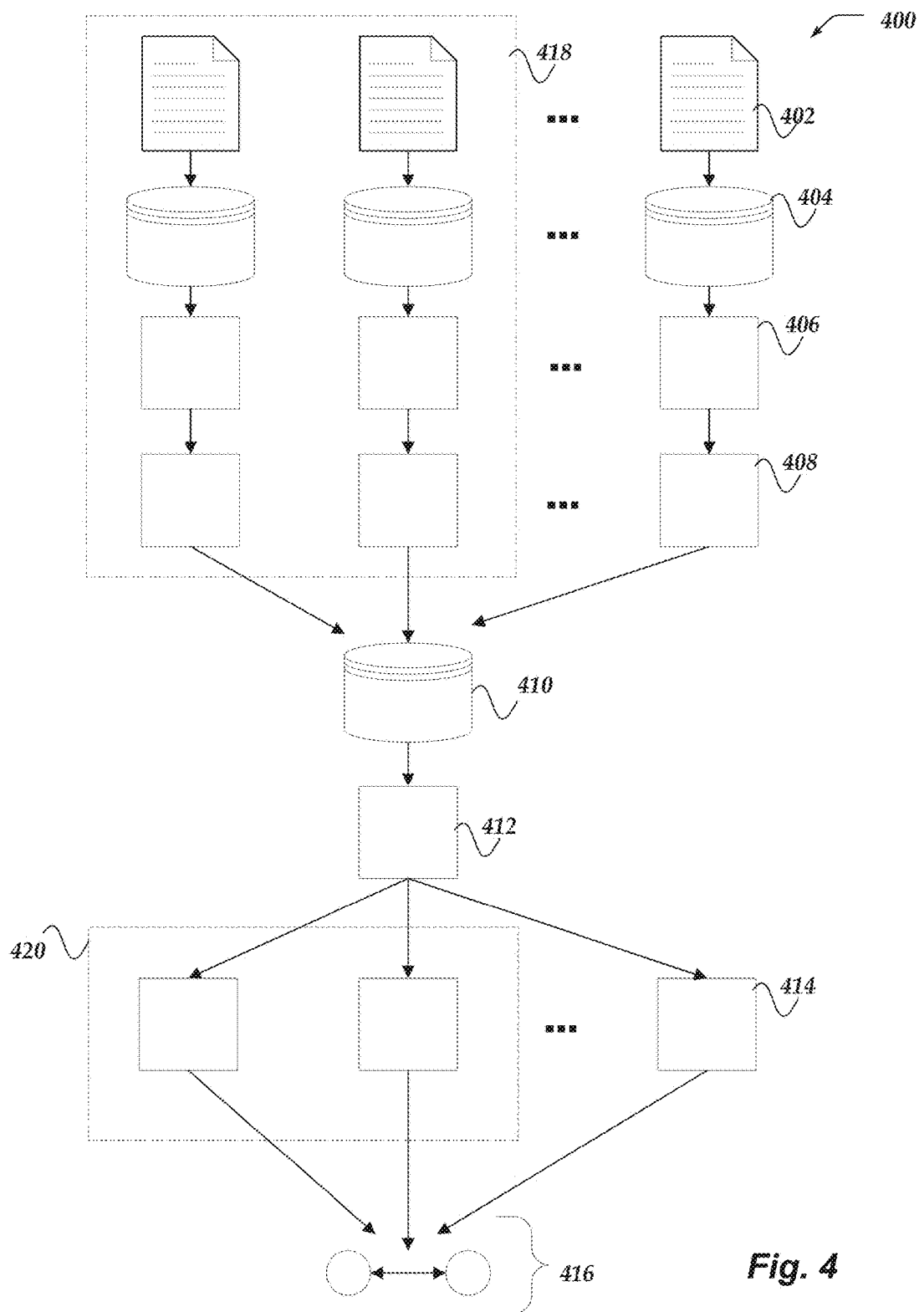
FIG. 4 shows a logical schematic of a portion of a modeling platform that is arranged to perform machine-assisted object matching in accordance with one or more embodiments.

FIG. 4 shows a logical schematic of a portion of modeling platform 400 that is arranged to perform machine-assisted object matching in accordance with one or more embodiments. In one or more of the various embodiments, a modeling platform may be arranged to analyze datasets to produce one or more similarity models for various objects based on the similarity of their features.

In one or more of the various embodiments, modeling platform 400 may be provided various raw datasets from various sources. In some embodiments, these datasets may be very large collections with several or millions of records per data object. Accordingly, a modeling platform such as modeling platform 400, may be used to model the datasets.

In one or more of the various embodiments, the modeling platform may be arranged to receive datasets and produce similarity models that enable users or applications to identify matching objects from different or distinct data sets. In particular modeling platform 400 may be arranged to identify fields in the different data objects that correspond to features that may be used to identify matches between data sets.

In one or more of the various embodiments, dataset 402 may be provided to data store 404. As described in above, data set 402 may be different forms, formats, and so on. Also, in one or more of the various embodiments, data set 402 may be the result of some initial data cleansing or data formatting, including de-duplicating before being stored on data store 404.

In one or more of the various embodiments, an attributes engine, such as, attributes engine 406 may be arranged to analyze the data objects stored in data store 404. Briefly, attributes engine 406 may process the data objects included in data set 402 to produce one or more model objects that correspond to the data objects.

In one or more of the various embodiments, a similarity engine, such as similarity engine 408 may be arranged to analyze one or more model objects to produce similarity models based on a configuration information or other user input. In one or more of the various embodiments, the analysis may include identifying one or more features, features types, or the like, for each model object. As describe below in more detail, similarity engines, such as similarity engine 408 may be arranged to identify potential object matches for model objects that may be included in separate or distinct data set. In some embodiments, model objects from one data set may be grouped or associated with one or more other model objects that appear to have the potential for matching.

In one or more of the various embodiments, users may modify the configuration information used for determining feature-by-feature based similarities to reflect their own understanding of what it means for objects to be similar.

In one or more of the various embodiments, model objects, potential match groups, or the like, may be stored in a data store, such as, data store 410.

In one or more of the various embodiments, a match rank client application 412, or the like, may be arranged to enable users to label model objects as true matches or non-matches. In one or more of the various embodiments, a similarity engine may be arranged to provide one or more model objects and one or more potential matching model objects to a client application. Accordingly, in some embodiments, the client application may be arranged to display the principal model object adjacent or otherwise, juxtaposed to the one or more candidate match model objects (e.g., potential matches).

In one or more of the various embodiments, if model objects are labeled, a ranking engine, such as, ranking engine 414 may be arranged to train a ranker designed for ranking the similarity scores for potential matched model objects to a principal object. In one or more of the various embodiments, the ranker may be arranged to always provide a top-ranked model object. Where in some embodiments, the top-ranked model object is the model object that is considered by the modeling platform to be the closest match to a principal object.

Accordingly, in one or more of the various embodiments, matched pairs, such as match pairs 416 may be provided based on the one or more principal model objects and a model object having the top-ranked similarity as selected by the ranking engine.

Further, in one or more of the various embodiments, if the principal object data set is known to match one to one to the candidate data set, the process may be complete. However, in some embodiments, if there is a possibility that the principal data set includes model objects that do not have a true match in the match candidate data set, additional processing may be required, as described below. Likewise, in some embodiments, if model objects in the principal data set match more than one model object in the match candidate data set, additional actions may be required, including de-duplication of model objects in the match candidate data set, or the like.

In one or more of the various embodiments, attributes engine 406 may be arranged to perform analysis comprised of monoidal operations that enable two or more attribute engine instances to run in parallel. In some embodiments, portions of data sets may be distributed across one or more data stores. Accordingly, in some embodiments, two or more attribute engines may process portions of the data sets to produce partial attribute values for the various model objects. Thus, in one or more of the various embodiments, the partial attribute values may be reduced or combined to produce attribute values for the model objects stored in data store 408.

Likewise, in one or more of the various embodiments, similarity engines, such as similarity engine 408 may be arranged to run in parallel as well. In some embodiments, the process of grouping and scoring model objects may be executed in parallel. Accordingly, in some embodiments, the number of similarity engines may be arranged to scale horizontally as needed. For example, similarity engines may be arranged to run in a clustered or cloud-based environment that enables compute instances to be provisioned or instantiated as needed.

In one or more of the various embodiments, partial cluster 418 and partial cluster 420 represent parallel or concurrent operations performed by two or more attribute engines, similarity engines, ranking engines, or the like. Note, in some embodiments, the separate attribute engines, similarity engines, ranking engines, or the like, may be arranged to process data objects stored on the same or shared data store.

In one or more of the various embodiments, as model objects are generated they may be stored in another data store, such as, data store 410. In one or more of the various embodiments, data store 410 represents a data store for storing one or more model objects. In some embodiments, data store 410 may be logically or physically separate from data store 410. Further, in some embodiments, data stores, such as data store 404 and data store 410 may be physical or logically segmented into portions the are allocated to one or more users. Accordingly, in some embodiments, one or more users may be prevented from accessing data and objects unless they have explicit access permissions.

In the prior art, one of the difficulties with the main problem is that the two classes of results are very unbalanced: the number of non-matches is considerably higher that the number of matches. For instance, if one tries to find the matches between a set of n records A and a set of n records B, where each element in A has exactly one match in B, the number of pairs of records to consider is $n^2$ while the number of matches is only n. This means that one has to correctly classify n matches versus $n(n-1)$ non-matches. In this example, a classifier that puts every pair of records in the class "non-match" may have very good accuracy but it fails to find a single match. The common technique to reduce the number of pairs to consider is to compute blocks of records, so as to group records such that true matches are in the same group and non-matches are in different groups. Then, only pairs of records in the same block are used. Even though blocking improves accuracy and computational complexity, the data to classify is still very unbalanced. In this unbalanced setting, besides the fact that the classifier must be trained such that it does not classify every pair as "non-match", one also has to deal with the difficulties of choosing meaningful data to label. For example, one might have to label many pairs of records that prove to be non-matches before labeling a few matches. This may be true even if some heuristics can be used, such as picking the pairs to label from the pairs which have high similarity values.

Another difficulty in this classification problem comes from the similarity metrics themselves. In some cases, these metrics are intended to reflect how similar two records are given their attributes. Ideally, higher similarity values should correspond to higher similarity of attributes and vice-versa. However, similarity metrics might not perfectly capture the real similarity (e.g., real similarity from the perspective of a user relying on the matched data sets) of records. For example, for some pairs of records that seem very similar to a human user, the computed similarity values may be low. Accordingly, in some cases, true matches identified by a user may have lower similarity values than non-matches. This fact contradicts the intuition that a random pair of model object with higher computed similarity score is more likely to be a true match than a random pair of model objects with lower similarity scores. This intuition, known as the "monotonicity assumption", is not always true depending on the data sets and the similarity scoring system.

Accordingly, in one or more of the various embodiments, the modeling platform (e.g., attributes engine, similarity engine, ranking engine, or the like, or combination thereof) may be arranged to provide an improved method and system for matching records from two or more distinct sets, where data set A is considered to be the principal data set and data set B may be considered to the potential matches set.

In one or more of the various embodiments, the modeling platform may be arranged to employ an active learning approach to identify record matches. Accordingly, in some embodiments, the modeling platform may be arranged to iteratively train and select new pairs of records to label. Accordingly, in one or more of the various embodiments, the modeling platform may employ its similarity engine or ranking engine to execute active learning processes to mitigate the unbalance of data to reduce the required size of training sets as well as improving classification performance. Accordingly, in one or more of the various embodiments, the modeling platform may be arranged to assume that, for a given record $a \in A$, its true matches are more similar to a than its non-matches.

In one or more of the various embodiments, the modeling engine may be arranged to learn what "more similar" means. Accordingly, in one or more of the various embodiments, the modeling platform may be arranged learn its definition of "more similar" from a limited number of labeled pairs of model objects that correspond to data set records. Briefly, in some embodiments, the modeling platform may be arranged to employ a ranking engine to train a ranker such that, for a given record $a \in A$, true matches from B are ranked higher than non-matches.

In one or more of the various embodiments, the modeling platform may be arranged to provide several advantages or improvements over standard systems. First, in some embodiments, as already mentioned, the modeling platform does not rely on the monotonicity assumption for matching records. Second, in some embodiments, the modeling platform may be arranged to use the top ranked records, thus a much smaller set of objects than the set of potential matches computed through standard blocking techniques. Besides improving computation complexity, this also makes the data less unbalanced providing the advantage of simplifying the classification problem. Accordingly, in one or more of the various embodiments, the modeling platform is often able to obtain improved results than other methods for several real datasets while using considerably less labeled data. Also, the amount of interactions required from the user is reduced. These are important improvements since generally real record matching problems do not contain labeled data, and so the labels must be obtained through user interactions, a costly and time-consuming process. Finally, several of the steps actions performed by the modeling platform may be distributed across multiple network computers or processes to enable horizontal scaling to reduce the amount time to process large data sets.

In one or more of the various embodiments, a modeling platform may be arranged to employ at least two sub-processes to classify pairs of model objects as matches or non-matches. In one or more of the various embodiments, a one process, described below, discovers matches in the case where two sets of model objects A and B are distinct. In some embodiments, another process, that is a modified version of the first process, may be arranged to perform deduplication if model object sets A and B may be the same set.

Accordingly, in some embodiments, if A and B are not the same set of model objects and that there are no duplicates in B (either known a priori, or by performing a deduplication process on B prior to attempting to discover matches)), the modeling platform may be arranged to find, for each model object a in A, the model object in B which is its match. Note that there cannot be more than one match for a in B; otherwise there are duplicates in B. If the modeling platform discovers the model object in B which is the most similar to a, according to some definition, this model object has a high probability of being the match of a. Also, in one or more of the various embodiments, the modeling platform may be arranged to perform actions to handle if some model objects in A have no match in B.

In one or more of the various embodiments, the "most similar object" may be considered the model object that is ranked the highest, among all possible matches for a (e.g., a model object from set A), by a trained ranker. In one or more of the various embodiments, the ranker may be trained such that the true match of a is ranked the highest by a ranking engine that employs the trained ranker. Accordingly, given several model objects from A, along with their potential match model objects and the true class (e.g., match or non-match) of the different pairs or model objects, the ranker may be trained to learn a function of the similarity values of the different pairs of model objects such that: for each model object a in the training set, the ranker places the true match of a higher than any other potential match (and thus non-match) of a. Note that, in some embodiments, the modeling platform does not rely on the similarity values of true matches to be higher than those of non-matches for all pairs of model objects; rather, this monotonicity assumption is not assumed to always be true. Instead, in one or more of the various embodiments, the modeling platform may be arranged such that, for each model object in A taken separately, the true match is "more similar" (e.g., ranked higher by the ranker) than its non-matches.

In one or more of the various embodiments, the modeling platform provides improved matching at least because of the application of the ranker. Classical less efficient approaches often are arranged to handle all potential matches together and classify them based on their similarity values, without taking into account the model objects that generated the numerical values used in the classification process. In contrast, a modeling platform, such as modeling platform 400 may be arranged to employ the identity of the initial model objects since they might represent useful information.

For example, some model objects in A might have many potential matches, thus contributing with many pairs to the data set to classify, while still having (at most) one true match each. In this case, these model objects generate a very unbalanced situation, because they bring many non-matches for only one true match each. Also, in some embodiments, some model objects in A might have very high similarity values with many of their potential matches. For example, take the case of a person who has a very common name and lives in a highly dense area. Their non-matches (e.g., all their potential matches except the true match) will have higher similarity values than true matches that correspond to other model objects in A. These true matches might be incorrectly classified because of the non-matches that have high similarity values. In contrast, in one or more of the various embodiments, a modeling platform may be arranged to compute the most similar model object for each model object in A, and thus avoid at least these situations because the potential matches (i.e. the true match and the non-matches) are compared for each model object a separately.

In one or more of the various embodiments, briefly, the modeling platform may be arranged to perform the following actions to matching model objects between two distinct sets of model objects A and B: 1) preprocess, if B is not known to have no duplicates, to discovers duplicate model objects in B; 2) compute blocks (e.g., blocking) to provide potential matches (a, b) with a∈A and b∈B; 3) for each potential match model object, compute feature-based similarities; 4) group the potential matching model objects by model objects in A (e.g., principal model objects); 5) select model objects in A and label their potential matches as true matches or non-matches; 6) train a ranker such that, for each model object a in the labeled data, the true match is ranked higher than the non-matches; 7) for each model object in A and its potential matches from B, use the ranker to select the highest ranked model object; 8) if it is known that each model object in A has a match in B, go to step 10; 9) otherwise, train a standard classifier on the pairs (a, most similar model object of a) in an active learning manner; 10) for each model object a∈A and its selected model object b∈B, output (a, b) as well as all (a, b') where b'∈B is a duplicate of b.

In one or more of the various embodiments, a modeling platform may be arranged such that several of the steps in list above may be performed in a distributed fashion. Thus, in one or more of the various embodiments, blocks (e.g., blocking) may be computed in parallel depending on the particular blocking process being used. For example, in some embodiments, distributed blocking may be performed if a hashing function is used as part of the blocking.

Also, in some embodiments, additional parallelism may be achieved if blocks are computed using canopy clustering. Further, step three may be done in parallel, as the computations are independent for each potential match. Step 4 implies a "reduce" operation. Also, even though the ranker may be trained in parallel, it may be trained sequentially (e.g., non-parellelized) because the ranker is generally trained using a very small set of model objects. Step 7 can be done in parallel, as well as the training in step 9.

Computation of the Most Similar Model Object

In one or more of the various embodiments, the modeling platform may be arranged to begin by grouping the potential matches by model objects in A. Accordingly, in one or more of the various embodiments, for each model object a∈A and one potential match b∈B, the feature-based similarities for the model objects may be computed as follows:

$$\text{sim}(a,b) = (\text{sim}_1(a,b), \text{sim}_2(a,b), \ldots, \text{sim}_k(a,b))$$

corresponding to k similarity metrics selected for matching model objects. Given a, if there exists a model object b' such that, for all potential matches b of a and all i from 1 to k, we have $\text{sim}_i(a, b') \geq \text{sim}_i(a, b)$, then b' may be considered to be the model object in B that is the most similar to a. Thus, if there exists a potential match b' that has higher or equal values, for all k metrics, than any other potential match, than b' is the most similar to a. In such cases, the model object b' may be considered to dominate the other potential matches of a.

In some embodiments, it may happen, that there is no such model object b' for many model objects a in A. Let $A_s \subseteq A$ be the subset of A of model objects for which there is no dominating potential match. In this case, the modeling platform may be arranged to employ machine-learning to learn to compute the most similar model object. Accordingly, in some embodiments, the modeling platform may begin by selecting model objects in $A_s$ in order to create a training set. For each selected model object a, the modeling platform may be arranged to provide the discovered potential matches of a (for which there is no dominating model object) to a user. In some embodiments, the user may be enabled to indicate the true match, if there is any. Potential matches not selected by the user may be labeled as non-matches.

In one or more of the various embodiments, the modeling platform may be arranged to train a ranker. Following a classical learning to rank approach, the modeling platform may be arranged to learn a function $f: [0 \ldots 1]^k \to R$ such that, for all a in the training set, its true match b' and its non-matches b, one has $f(\text{sim}(a, b')) > f(\text{sim}(a, b))$. Accordingly, the ranker will be trained to provide a higher value of $f$ for the true match of a than for the non-matches. To learn the function $f$, the modeling platform may be arranged to a well-known learning to rank algorithm, such as, RankSVM algorithm, or the like.

In one or more of the various embodiments, if RankSVM is used, the modeling platform may be arranged to compute a vector of weights $w \in R^k$ that minimizes the following objective function:

$$\frac{\lambda}{2}\|w\|^2 + \frac{1}{|P|} \sum_{(b',b) \in P} L(<w, sim(a, b') - sim(a, b)>)$$

where $\lambda$ is a regularization parameter, P is the set of pairs (match of a, non-match of a) in the training set and $L(t) = \max(0, 1-t)$ is a hinge loss function written for the pairs (match, non-match). Note that RankSVM may be equivalent to a classical SVM whose input items are the difference vectors (sim(a, b')−sim(a, b)).

Finally, the function $f$ may be defined as $f(x) = <w, x>$ using the resulting vector w and is computed for every pair (a, b) where b is a potential match of a. The values of $f$ for the different potential matches of a may define a ranking of these potential matches. As the final step, the modeling platform may be arranged to select for each $a \in A_s$ the model object $$b' = \underset{b=\text{potential match } a}{\operatorname{argmax}} f(sim(a, b)).$$

In one or more of the various embodiments, the modeling platform may be arranged to identify this model object to as the most similar to a.

In one or more of the various embodiments, if some model objects in A do not have a match in B, false positives may be produced: each of these model objects has a most similar one, but these pairs should not be output in the final result. As described in more detail below, the modeling platform may be arranged to reduce false positives by deduplication of model objects in set B.

In one or more of the various embodiments, the modeling platform may be arranged to select the model objects $a \in A_s$ that may be provided to a user for labeling. Note, in some embodiments, the modeling platform may be arranged to consider the labeled data for a if a has at least one true match and one non-match that get labeled.

In one or more of the various embodiments, the modeling platform may be arranged to select the model objects to be labeled at random among the model objects in $A_s$ that have at least two potential matches and that have high values for $\Sigma_{i=1 \ldots k} sim_i(a, b)$ for at least one of the potential matches. By selecting among model objects with high sums of similarities, the modeling platform may be selecting principal model objects that may have a higher chance of finding true matches in the labeled set than by picking model objects randomly in $A_s$. This, of course, is necessary only if there are model objects in A that do not have a match in B.

Active Learning Classification of Model Objects

In one or more of the various embodiments, the modeling platform may be arranged to manage an active learning method for classifying model objects as matches or non-matches. In one or more of the various embodiments, this method (e.g., step 9) may be employed to detect the false positives (model object a, most similar model object for a) in the case where some model objects in A do not have a match in B. In some embodiments, the modeling platform may be arranged to employ this same method to classify all potential matches and to use for validating or comparing with matches identified by the complete process (e.g., step 1-10 shown above).

Accordingly, in some embodiments, the modeling platform may be arranged to train a random forest classifier in an active learning manner; other types of classifiers could also be used here. In some embodiments, the modeling platform may be arranged to start with an initial set of labeled pairs of model objects that may be used to train a first classifier. Next, in some embodiments, the modeling platform may be arranged to then iterate through the following steps:

using the current classifier, all the model object pairs may be classified;

new pairs to label may be randomly selected, in some embodiments, pairs for which the ratio of the number of trees in the random forest classifier that predict "match" versus the number of trees that predict "non-match" is close to 1; thus selected pairs are those for which the classifier made a low confidence prediction.

Accordingly, in one or more of the various embodiments, the modeling platform may be arranged to use the above classification method to classify the pairs (a, b') with $a \in A$ and b' the most similar model object to a, based on computed feature based similarity scores. In one or more of the various embodiments, the classification may be based on the similarity values: sim(a, b').

In one or more of the various embodiments, the modeling platform may be arranged to begin by selecting an initial training set of model objects. In some embodiments, since previously labeled model objects may have been used to train the ranker for the ranking engine, those labeled model objects may be re-used here. Namely, for every model object a selected for training the ranker, the modeling platform may use its most similar model object b' and the label of (a, b'). Depending on the ratio of true matches to non-matches selected in this manner, new model object pairs may be randomly selected for labeling. For example, in some embodiments, if more non-matches may be needed in the training set, they may be selected from among pairs of model object having low values for $f(sim(a, b'))$, where $f$ is the function generated by the modeling platform during the ranking step discussed above; similarly, the modeling platform may be arranged to select among pairs of model objects that have high values for $f(sim(a, b'))$ if there may be a high number of non-matches in the training set. This first training set enables the training of the first classifier which may be refined via iteration as explained before.

In one or more of the various embodiments, if classifying the pairs (model object a, most similar model object for a) only, a much easier classification problem is presented than if all potential matches were classified using a classical classification approach. Here, in one or more of the various embodiments, the number of pairs of model objects to classify may be equal to the cardinality of the set A, which is a much smaller set than the set of all potential matches. Also, in one or more of the various embodiments, these innovations reduce the occurrence of situations where some model objects bring many potential matches (and thus non-matches) to the classification set because the modeling platform here is classifying model objects that have at most one potential match—the potential match object that was top-ranked by the ranker.

Deduplication

As mentioned in above, it suffices to only consider the most similar model object in the computation of potential matches if each model object in A has (at most) one match in B. If there are duplicates in B, each model object in A might have more than one match in B and taking the most similar model object only might miss true matches. However, the modeling platform may be arranged to discover duplicate model objects in B before trying to discover matches between A and B, ensuring that the approach of taking the most similar model object remains valid.

In one or more of the various embodiments, the modeling platform may be arranged to discover duplicated model objects in B using a process that is similar to discovering matches between A and B because for each b∈B we want to find all b' such that b and b' are a match. If model objects in B have some unique identifier and, if for every b∈B the modeling platform discovers matching model object that have a higher identifier than b and, for each found pair of matches (b, b'), (b, b') is provided as well as (b', b), all the matches may be provided. So it suffices to find for each model object b∈B its matches that have a higher identifier.

In one or more of the various embodiments, the modeling platform may be arranged to discover duplicates in B by performing the following actions: 1) compute blocks resulting in potential matches (b, b') with b, b'∈B and id(b')>id(b); 2) for each potential match, compute feature-based similarities; 3) group the potential matches by the left element in each pair; 4) select model objects in B and label their potential matches as true matches or non-matches; 5) train a ranker such that, for each model object b in the labeled data, the true matches are ranked higher than the non-matches; 6) for each model object in B and its potential matches, use the ranker and select the highest ranked model object; 7) train a classifier on the pairs (b, most similar model object of b) in an active learning manner and select the pairs classified as matches; 8) given a graph formed by the model objects in B (as vertices) and the pairs (b, most similar model object of b) classified as matches in the previous step (as edges), traverse the graph to discover the connected components; for each connected component, output all the pairs of vertices in the component.

Figure 5:
FIG. 5 illustrate a logical representation of a user interface that may be used for identifying true model object matches in accordance with one or more of the various embodiments.

FIG. 5 illustrate a logical representation of user interface 500 that may be used for identifying true model object matches in accordance with one or more of the various embodiments. As described above, the modeling platform may be arranged to present a selection of principal model objects and two or more potential match model objects to a user. Accordingly, in one or more of the various embodiments, the user may be enabled to identify which of the potential match objects is a true match. In this example, for some embodiments, one or more feature values of principal model object 502 may be displayed to a user. Also, as shown in this example, one or more potential match objects may be displayed. In this example, the user has indicated that potential match object 504 is a true match with principal object. After a user selects true matches (if there are any) for one principal model object, the modeling platform may be arranged to use model objects from the user's selections and display another principal model object and its associated potential match objects.

In one or more of the various embodiments, the modeling platform may be arranged to keep providing principal model objects with their associated potential match objects until the modeling platform has collected sufficient true match information to enable the ranking engine to train a ranker. In one or more of the various embodiments, the number of principal model objects provided to a user for identifying true matches may depend on the nature of the data, desired accuracy, size of the corpus, or the like. Accordingly, in one or more of the various embodiments, the specific number of evaluations to perform may be a configurable option driven by configuration information, rules, user input, or the like.

Also, in one or more of the various embodiments, the modeling platform (e.g., ranking engine) may be arranged to interactively evaluate that accuracy of the ranker as it being trained. For example, as true matches are provided by the user, the modeling platform may be arranged to evaluate the ranker undergoing training using the previously identified true matches. Thus, in some embodiments, if the ranker begins to identify true matches consistently (e.g., prediction quality or prediction score exceeds a defined threshold), the modeling platform may indicate the ranker is trained and ready for use.

Also, in some embodiments, the modeling platform may employ the ranker undergoing training to guess the true match for a principal model object before displaying the potential match objects to the user. For example, in some embodiments, the modeling platform may be arranged to continuously evaluate the quality of the ranker as it is being trained. Accordingly, in some embodiments, if the ratio of the number of correctly identified top-ranked potential match objects to user identified true matches exceeds a defined threshold values, the modeling platform or the ranking engine may be arranged to indicate that the ranker may be sufficiently trained.

Also, in one or more of the various embodiments, one or more pre-processing actions completed during ingestion of the raw data may include generating data sketch information that describes one or more features of the raw data set, such as, variance, entropy, number of unique feature values, feature value frequency, value quantiles, or the like, or combination thereof. Accordingly, in one or more of the various embodiments, users may employ the data sketches of the model objects to inform how to evaluate rankers or other classifiers used by the modeling platform. For example, if the data represented by the model objects is known to include feature values that vary widely even though they are considered matching, the training success threshold for a ranker may be configured to be lower than data sets known to be more regular.

Likewise, in one or more of the various embodiments, the type of data or its intended use may guide configuration. For example, in some embodiments, if the intended application of the matched model objects requires increased accuracy, the training score threshold values may be adjusted accordingly. Whereas, in one or more of the various embodiments, less critical applications may be configured to have lower training success thresholds.

Generalized Operations

FIGS. 6-9 represent the generalized operations for machine-assisted record matching in accordance with at least one of the various embodiments. In one or more of the various embodiments, processes 600, 700, 800, and 900 described in conjunction with FIGS. 6-9 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. In one or more of the various embodiments, a modeling platform that include one or more engines, such as an attributes engine, similarity engine, ranking engine, or the like, may be arranged to implement processes 600, 700, 800, and 900. Further, one or more of the various embodiments, the processes described in conjunction with FIGS. 6-9 may be operative in machine-assisted object matching such as described in conjunction with FIGS. 4-5.

Figure 6:
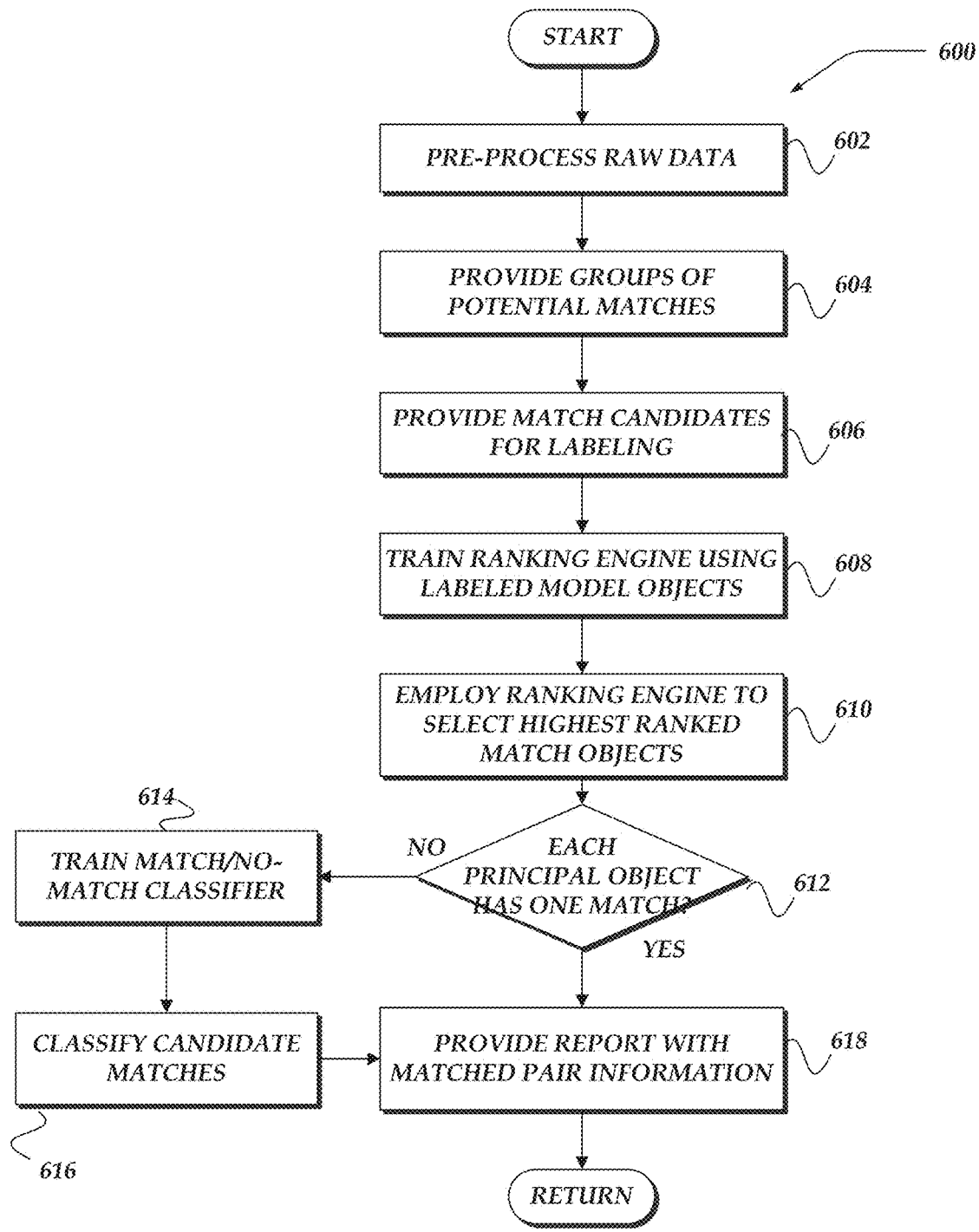
FIG. 6 illustrates an overview flowchart for a process for machine-assisted model object matching in accordance with one or more of the various embodiments.

FIG. 6 illustrates an overview flowchart for process 600 for machine-assisted model object matching in accordance with one or more of the various embodiments. After a start block, at block 602, in one or more of the various embodiments, one or more raw data sets may be processed to transform them into model objects. In one or more of the various embodiments, an attributes engine, such as attributes engine 322 may be arranged to ingest raw data from various sources and transform it into model objects. See, FIG. 9. At block 604, in one or more of the various embodiments, one or more groups of potential matches may be provided. In one or more of the various embodiments, a similarity engine, such as, similarity engine 324 may be arranged to perform blocking to group one or more potential match model object with their respective principal model objects. As described above, the blocking may be arranged to identify model objects that have a reasonable potential to match a given principal model object.

In one or more of the various embodiments, the modeling platform or similarity engine may be arranged to include modular plug-ins, dynamic libraries, configuration information, scripts, rules, or the like, or combination thereof, that may provide implementation or configuration information for one or more blocking, grouping, or indexing systems that may be used to identifying potential model objects. Accordingly, different blocking systems may be used by the similarity engine based on configuration information, or the like. For example, in some embodiments, modeling platform users may prefer particular blocking algorithms or protocols be used with particular data sets. In some embodiments, the modular architecture of the similarity engine or the modeling platforms, enables blocking systems to be substituted as needed to conform to different data sets, application goals, or the like.

At block 606, in one or more of the various embodiments, one or more potential match candidates may be provided for labeling. In one or more of the various embodiments, as described above, the modeling platform may be arranged to randomly select one or more principal model objects for display to a user. Each selected principal model object along with its associated potential match model objects may be displayed in a user-interface that enable a user to identify which, if any, of the potential match model objects is a true match to their associated principal model object. Accordingly, in one or more of the various embodiments, the modeling platform may tag, or otherwise, record which of the potential model objects is a true match and which one are non-matches.

At block 608, in some embodiments, a ranking engine may be arranged to train a ranker for the ranking the potential matches with respect to how closely they match their principal object. As described above, a ranking engine, such as ranking engine 326 may be arranged to generate a ranker using a learning to rank machine learning process. In one or more of the various embodiments, the ranker may be trained as discussed above.

In one or more of the various embodiments, the ranking engine may be arranged to include modular plug-ins, dynamic libraries, configuration information, scripts, rules, or the like, or combination thereof, that may provide implementation or configuration information for one or more learning to rank algorithms. Accordingly, different learn to rank systems may be used by the ranking engine based on configuration information, or the like. For example, in some embodiments, modeling platform users may prefer particular learning to rank algorithms or protocols be used with particular data sets. In some embodiments, the modular architecture of the ranking engine or the modeling platforms, enables learning to rank systems to be substituted as needed to conform to different data set, application goals, or the like.

At block 610, in one or more of the various embodiments, the ranking engine may be employed to select the highest ranked in terms of similarity model objects. As described above, in one or more of the various embodiments, the ranking engine may be arranged to employ the trained the ranker to rank potential match model objects.

At decision block 612, in one or more of the various embodiments, if each model object in the principal data set is known to have a single match in the potential match data set, control may flow to block 618; otherwise, control may flow to block 614. In one or more of the various embodiments, if there is a single match for each principal model object in the principal data set, the trained ranker may be considered sufficient for matching model objects. However, if there are unmatched principal objects, the ranker will suggest a top-ranked match which will necessarily be incorrect, the top-ranked potential match model object will be a non-match. Accordingly, additional actions may be required to train a secondary classifier to detect top-ranked potential match model objects that are not actual true matches.

At block 614, in one or more of the various embodiments, the modeling platform may be arranged to train a classifier for identifying matches/no-matches. In one or more of the various embodiments, a similarity engine may be arranged to train a classifier for identifying false positives produced by the ranking engine. In one or more of the various embodiments, the classifier may be trained to distinguish between top-ranked potential model objects that are true matches from top-ranked potential model objects that are non-matches.

In one or more of the various embodiments, the similarity engine may be arranged to include modular plug-ins, dynamic libraries, configuration information, scripts, rules, or the like, or combination thereof, that may provide implementation or configuration information for one or more machine learning algorithms or protocols for training classifiers to distinguish between top-ranked potential model objects that are true matches from top-ranked potential model objects that are non-matches. Accordingly, different machine learning systems may be used by the similarity engine based on configuration information, or the like. For example, in some embodiments, modeling platform users may prefer particular machine learning algorithms or protocols be used with particular data sets or applications. In some embodiments, the modular architecture of the similarity engine or the modeling platform, enables various machine learning systems to be substituted as needed to conform to different data set, application goals, or the like.

At block 616, in one or more of the various embodiments, the modeling platform may employ the trained classifier to identify false positive matches resulting from unmatched principal model objects. In one or more of the various embodiments, since there may be top-ranked potential match model objects that are non-matches, the modeling platform may be arranged to employ a similarity engine to identify these false positive indications.

At block 618, in one or more of the various embodiments, the modeling platform may be arranged to provide one or more reports regarding the matched model objects. In one or more of the various embodiments, pairs of matched model objects may be stored such that users or other applications may retrieve them as needed. In some embodiments, matched objects may be merged into a single data set. In other embodiments, information indicating the matching relationship between the principal model objects and the matched model object may be stored such that the principal data set and the match data set may remain distinct. Next, control may be returned to a calling process.

Figure 7:
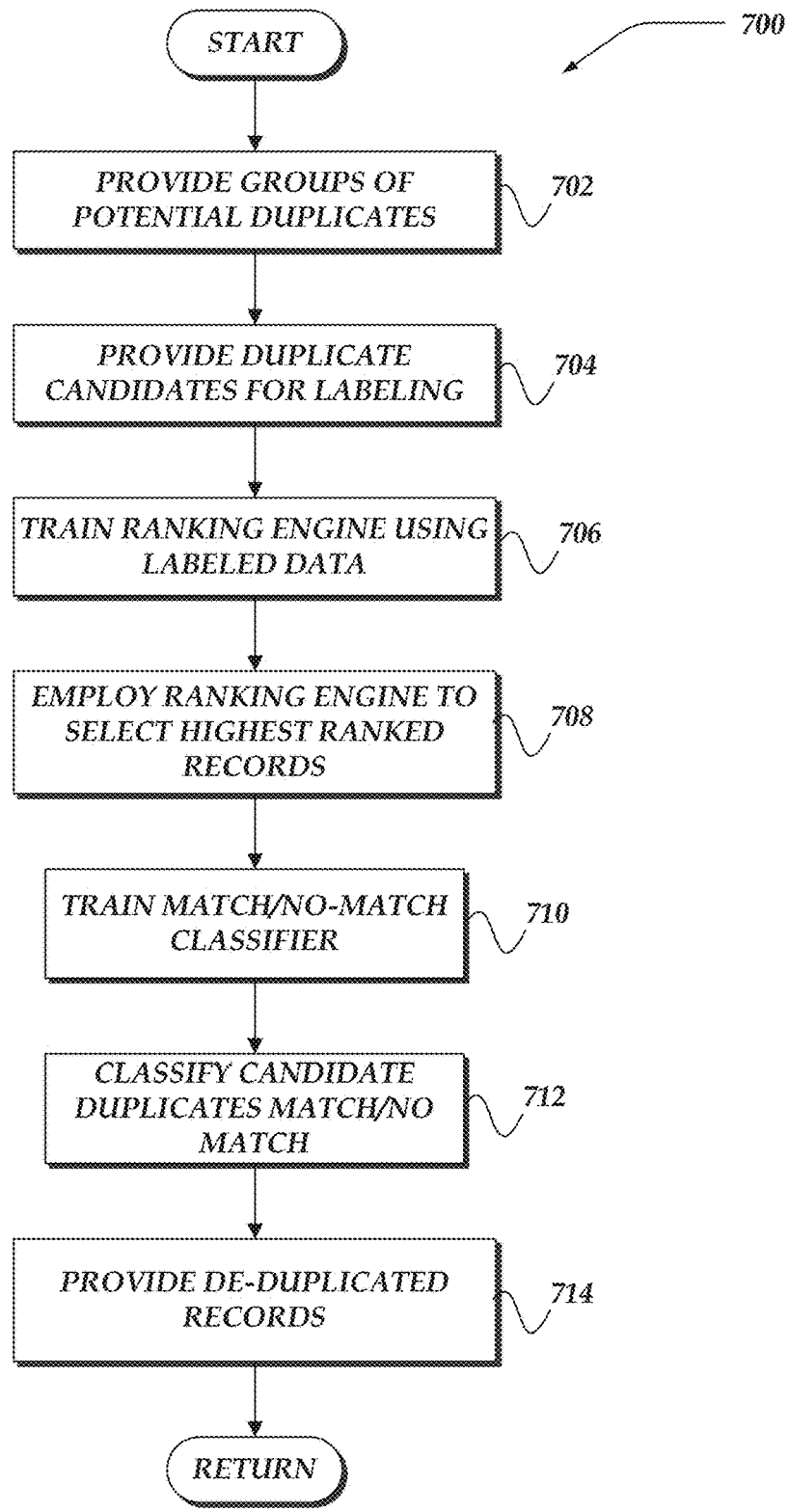
FIG. 7 illustrates a flowchart for a process for de-duplicating model objects in support of machine-assisted object matching in accordance with one or more of the various embodiments.

FIG. 7 illustrates a flowchart for process 700 for de-duplicating model objects in support of machine-assisted object matching in accordance with one or more of the various embodiments. In one or more of the various embodiments, as mentioned above, if one or more of the data sets may include duplicate records, the modeling platform may be arranged to perform actions to dep-duplicate those data sets as part of a pre-processing process. In one or more of the various embodiments, with few exceptions, the de-duplication process may be similar to the matching process. In one or more of the various embodiments, the principal data set and matching data set are the same data set, where the modeling platform is arranged to identify duplicates by attempting to match model objects in a data set with one or more model objects in the same data set.

After a start block, at block 702, in one or more of the various embodiments, one or more groups of potential duplicates may be provided. In one or more of the various embodiments, as described above, the modeling platform may perform a blocking process to group model objects with potential matches in the same data set (e.g., duplicates). At block 704, in one or more of the various embodiments, one or more of the groups of potential duplicate model objects may be provided to a user for labeling true matches or non-matches. This may be the same or similar labeling process as described above. At block 706, in one or more of the various embodiments, a ranking engine may be employed to use the labeled model objects to train a ranker for ranking the potential duplicates for a given model object. At block 708, in one or more of the various embodiments, the ranking engine may be employed to identify the most similar candidate duplicate model objects based on the trained ranker.

At block 710, in one or more of the various embodiments, the modeling platform may be arranged to train match/no-match classifier. In one or more of the various embodiments, this secondary classifier is used to identify false positives as described above. At block 712, in one or more of the various embodiments, the candidate duplicates may be classified as match or non-match using the trained secondary classifier. At block 714, in one or more of the various embodiments, the de-duplicated data set may be provided for matching with a distinct (e.g., principal) data set as described above. Next, control may be returned to a calling process.

Figure 8:
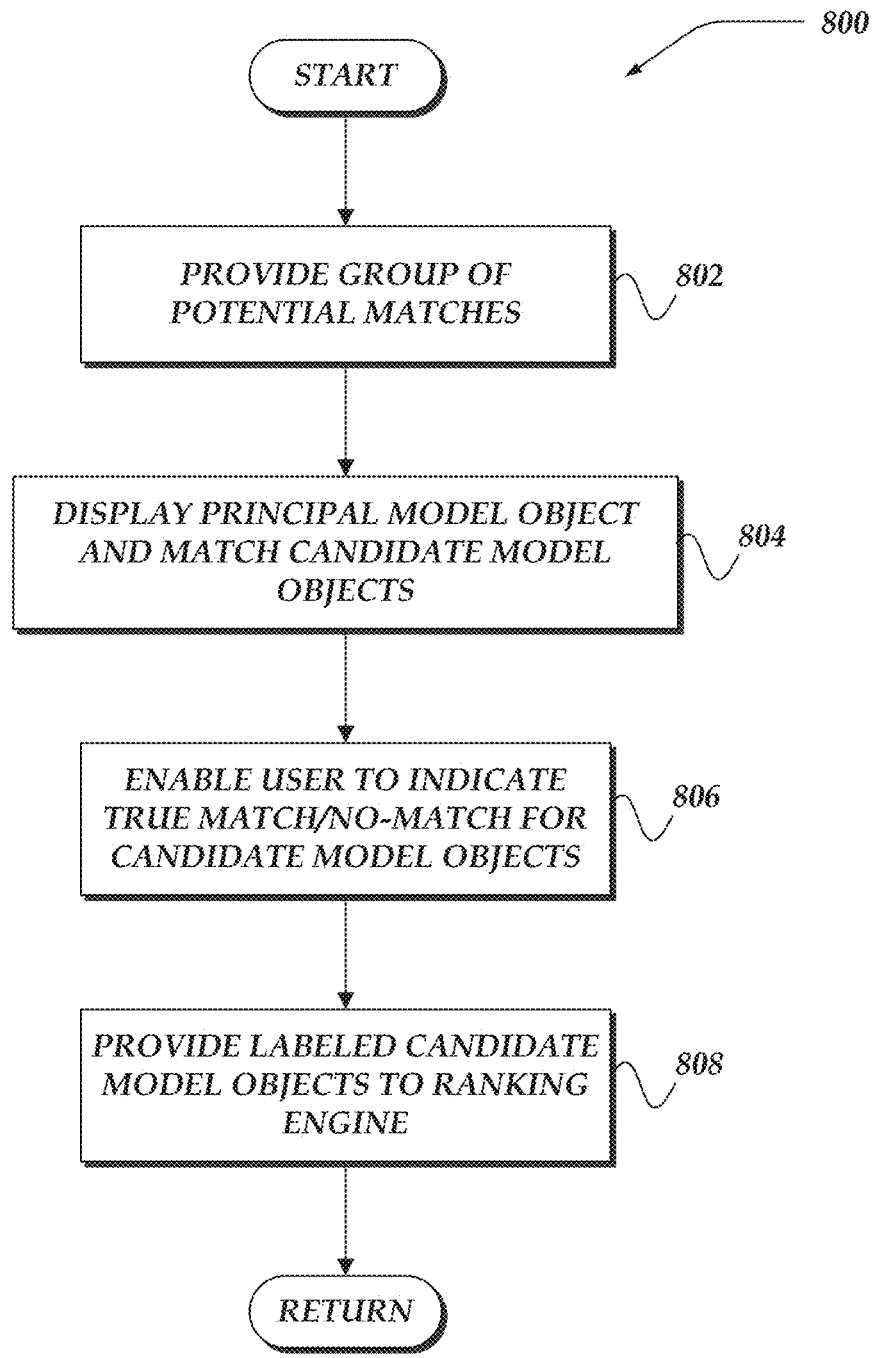
FIG. 8 illustrates a flowchart for a process for generating labeled data that may be used for training a ranker as part of machine-assisted object matching in accordance with one or more of the various embodiments.

FIG. 8 illustrates a flowchart for process 800 for generating labeled data that may be used for training a ranker as part of machine-assisted object matching in accordance with one or more of the various embodiments. In one or more of the various embodiments, as discussed above, a modeling platform may be arranged to include a ranking engine. In some embodiments, ranking engines may be arranged to train a ranker. Also, in some embodiments, ranking engines may be arranged to employ trained rankers to identify matched model object pairs.

In one or more of the various embodiments, the modeling platform may be arranged to select training data that include two or more principal model objects and their associated potential match model objects. As described, the modeling platform may be arranged to select training data based on heuristics, rules, configuration information, or the like. The number of objects included in a training set may vary depending on the type of data or type of applications. For example, some types of data or some data sets of a given type, may be easier or harder to use for training rankers or other classifiers.

After a start block, at block 802, in one or more of the various embodiments, a principal model object and its group of potential matching objects may be provided. In one or more of the various embodiments, the ranking engine or other part of modeling platform may be arranged to select a principal model object from a training set. In one or more of the various embodiments, by selecting a principal model object from the training set, a group of potential match model objects are also identified.

At block 804, in one or more of the various embodiments, the principal model object and the group of potential matching model objects may be displayed to a user. As user-interface, such as user-interface 500 in FIG. 5 may be provided to a user. The one or more principal model objects from the train set may be displayed along with their associated potential match model objects.

At block 806, in one or more of the various embodiments, the user may be enabled to indicate true matches or non-matches for candidate model objects. In one or more of the various embodiments, for each display principal model object the user may be enabled to label which of its associated potential match model objects, if any, are true matches. Likewise, in one or more of the various embodiments, potential match model objects that are not labeled true matches may be labeled non-matches. In some embodiments, the user-interface may be arranged to enable the user to label non-matches rather than labeling matches. Also, in one or more of the various embodiments, the user-interface may be arranged to enable users to label potential match model objects as, true-matches, non-matches, or the like. At block 808, in one or more of the various embodiments, the labeled potential match model objects may be provided to the ranking engine. Next, control may be returned to a calling process.

Figure 9:
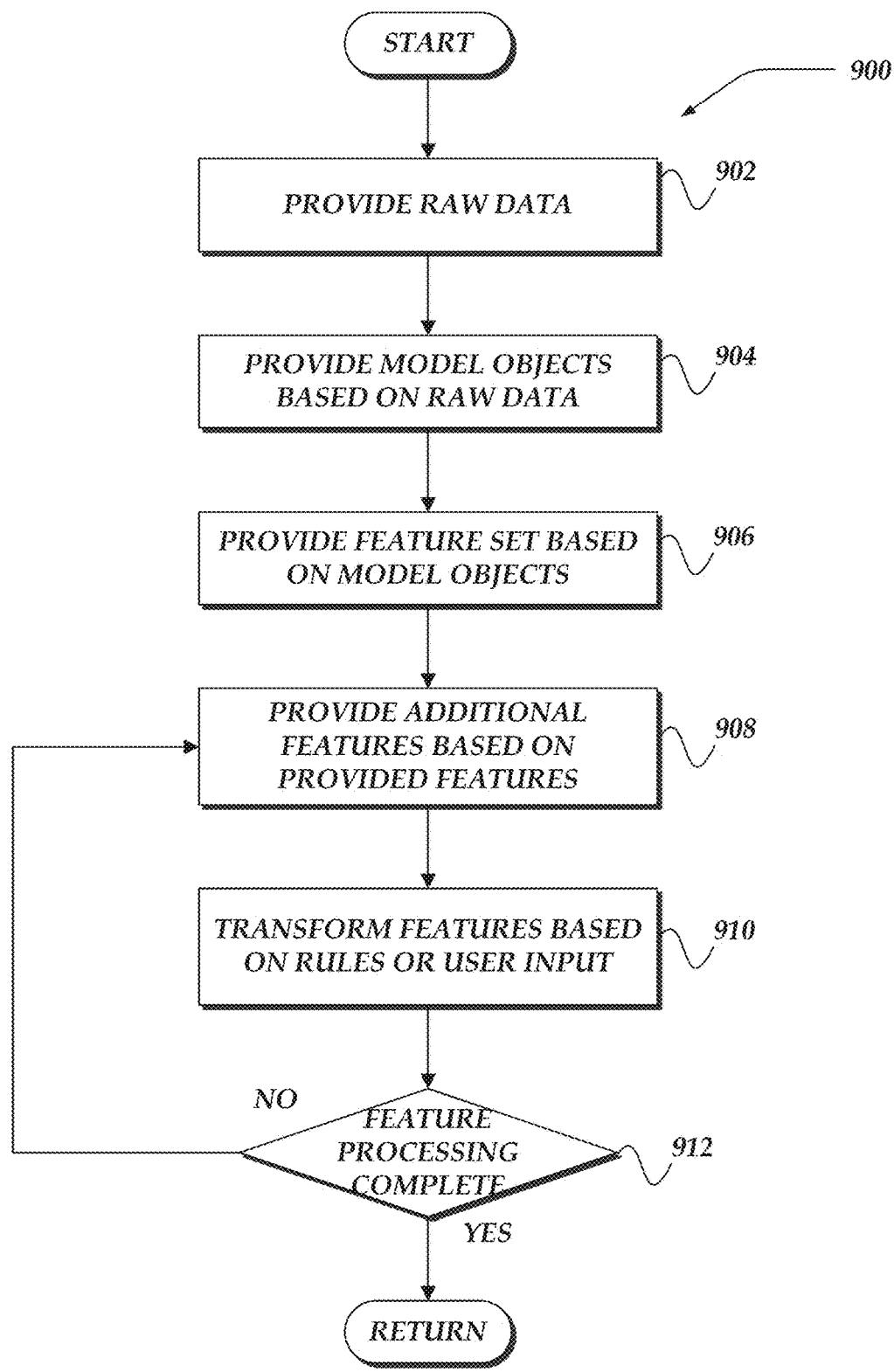
FIG. 9 illustrates an overview flowchart for a process for feature pre-processing for machine-assisted object matching in accordance with one or more of the various embodiments.

FIG. 9 illustrates an overview flowchart for process 900 for feature pre-processing for machine-assisted object matching in accordance with one or more of the various embodiments. After a start block, at block 902, in one or more of the various embodiments, raw data may be provided to the modeling platform. In one or more of the various embodiments, data used for generating model objects may be collected from various sources. The format or content of the raw data may vary widely depending on a given application.

In at least one of the various embodiments, raw data sets may be comprised of files, database dumps, database result sets, inventory lists, payroll model objects, log files, or the like, or combination thereof. In at least one of the various embodiments, the raw data sets may be provided via a network, file system, database/service API, or the like, or combination thereof. In some embodiments, raw data sets may be provided by one or more source data servers, such as source data server computer 118, or the like. In at least one of the various embodiments, source data servers may be communicated with over a network, such as, network 110 or wireless network 108.

At block 904, in one or more of the various embodiments, an attribute engine may be arranged to provide one or more model objects based on the raw data. Accordingly, in one or more of the various embodiments, the attribute engine may be arranged to process the raw data to provide one or more model object types and model objects. In one or more of the various embodiments, model objects may be generated based on the original structure or format of the raw data set.

For example, in one or more of the various embodiments, if the raw data is a database dump from a SQL database, the model objects may correspond to one or more tables included in the database dump. In other embodiments, if the raw data is structured using XML or the like, the structure or selection of the model objects may be taken directly from the structure of the raw data.

In one or more of the various embodiments, the accuracy of automatic machine based production of model objects (from raw data) may correlate to the level of structural definition or information that the raw data includes. Accordingly, in some embodiments, raw data that may be structured using well-known formats may be more likely to be successfully ingested without significant pre-processing or user intervention. Further, in one or more of the various embodiments, raw data that may be provided with meta-data such as data schemas, ontology information, mapping information, or the like, may be easier to ingest that raw data that is provided without meta-information that described the structure of the raw data.

In one or more of the various embodiments, raw data may be insufficiently structured to automatically determine model objects. Accordingly, one or more ingestion rules or other configuration information may be provided for a given raw data set. In some embodiments, the particular ingestion rules may depend on the content or format of the data as well as the intended application of the model objects or similarity models that will be based on those model objects.

At block 906, in one or more of the various embodiments, a feature set may be provided based on the model objects. In one or more of the various embodiments, model object types may be associated with one or more features or one or more feature types. In one or more of the various embodiments, features may be identified directly from model objects. In one or more of the various embodiments, during the ingestion of the raw data one or more properties may be identified as being associated with a given model object. For example, in some embodiments, if the model objects are generated based on database table dumps or database schema files, the model objects may correspond to one or more tables with their features corresponding to table columns for a given column. Likewise, in one or more of the various embodiments, other structural information included in the raw data may be initially relied upon to determine model object features. For example, in some embodiments, if the raw data is XML files, one or more top level elements may be model objects with one or more sub-elements defining the features for each model object.

At block 908, in one or more of the various embodiments, one or more additional features may be provided based on one or more other features. In one or more of the various embodiments, the features automatically identified by the modeling platform may insufficiently model the attributes a user may be interested in analyzing. Accordingly, in one or more of the various embodiments, the modeling platform may enable users to define new or additional features that may be based on the features there were automatically determined.

In one or more of the various embodiments, a user-interface may be arranged to enable users to group features or feature values to provide additional or modified features for the model objects. For example, if a feature such as environmental temperature is automatically identified from the raw data, a user may want to introduce a conversion or normalization function to convert the temperature values into a particular temperature scale, enforce significant figure rules, or the like.

At block 910, in one or more of the various embodiments, one or more features may be transformed according to one or more rules or user input. At decision block 912, in one or more of the various embodiments, if feature processing is complete, control may be returned to a calling process; otherwise, control may loop back to block 908. Next, control may be may returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

The invention claimed is:

1. A method for managing data using one or more processors, included in one or more network computers, wherein the one or more processors execute instructions to perform actions, comprising:
employing a source data server to provide a principal data set of principal objects and another data set of other data objects;
instantiating a first engine to perform actions including:
associating one or more principal objects with one or more other objects that are selected as potential matches to the one or more of the principal objects; and
identifying each match and non-match of the one or more of the selected other objects with their associated principal object; and instantiating a second engine to train and employ a ranker to identify a matched other object that is top-ranked in similarity by its association with the one or more principal objects;

instantiating a third engine to selectively filter the other objects to rank each matched other object higher than other objects associated with a same principal object; and employing geolocation information from a Global Positioning System (GPS) device at a client computer to determine one or more features that are included in a display of the ranked other objects to a user to improve the user's understanding, wherein the features include one or more of time zones, languages, currencies, or calendar formatting that is displayed to the user of the client computer when the client computer is located at a particular geo-location.

2. The method of claim 1, wherein the first engine performs further actions comprising selecting the one or more principal objects based on one or more heuristics and one or more associations with the selected other objects.

3. The method of claim 1, further comprising employing a hardware security module to provide tamper resistant safeguarding of cryptographic information.

4. The method of claim 1, further comprising:
providing raw data; and
transforming the raw data into model objects that are included in one or more of the principal data set or the other data set.

5. The method of claim 1, wherein the first engine performs further actions comprising:
training a classifier to distinguish between matches and non-matches; and
employing the classifier to discover incorrect identification of matches.

6. The method of claim 1, further comprising:
grouping the other objects in the other data set with potential duplicate objects in the other data set; and
training and employing another ranker to rank potential duplicate objects based on their similarity to their associated principal duplicate object, wherein a top-ranked potential duplicate object is indicated as a duplicate object.

7. A system for managing data, comprising:
a network computer, comprising:
a transceiver that communicates over the network;
a memory that stores at least instructions; and
one or more processor devices that execute instructions that perform actions, including:
employing a source data server to provide a principal data set of principal objects and another data set of other data objects;
instantiating a first engine to perform actions including:
associating one or more principal objects with one or more other objects that are selected as potential matches to the one or more of the principal objects; and
identifying each match and non-match of the one or more of the selected other objects with their associated principal object; and
instantiating a second engine to train and employ a ranker to identify a matched other object that is top-ranked in similarity by its association with the one or more principal objects; and instantiating a third engine to selectively filter the other objects to rank each matched other object higher than other objects associated with a same principal object; and employing geolocation information from a Global Positioning System (GPS) device at a client computer to determine one or more features that are included in a display of the ranked other objects to a user to improve the user's understanding of the ranked other objects, wherein the features include one or more of time zones, languages, currencies, or calendar formatting that is displayed to the user of the client computer when the client computer is located at a particular geo-location; and the client computer, comprising:
a GPS device;
a client computer transceiver that communicates over the network;
a client computer memory that stores at least instructions; and
one or more processor devices that execute instructions that perform actions, including:
providing the display of the ranked other objects to the user.

8. The system of claim 7, wherein the first engine performs further actions comprising selecting the one or more principal objects based on one or more heuristics and one or more associations with the selected other objects.

9. The system of claim 7, further comprising employing a hardware security module to provide tamper resistant safeguarding of cryptographic information.

10. The system of claim 7, further comprising:
providing raw data; and
transforming the raw data into model objects that are included in one or more of the principal data set or the other data set.

11. The system of claim 7, wherein the first engine performs further actions comprising:
training a classifier to distinguish between matches and non-matches; and
employing the classifier to discover incorrect identification of matches.

12. The system of claim 7, further comprising:
grouping the other objects in the other data set with potential duplicate objects in the other data set; and
training and employing another ranker to rank potential duplicate objects based on their similarity to their associated principal duplicate object, wherein a top-ranked potential duplicate object is indicated as a duplicate object.

13. The system of claim 7, further comprising, distributing one or more instances of one or more of the first engine, the second engine, or the third engine across two or more separate network computers, wherein the one or more instances may execute in parallel or concurrently.

14. A network computer for managing data, comprising:
a transceiver that communicates over the network;
a memory that stores at least instructions; and
one or more processor devices that execute instructions that perform actions, including:
employing a source data server to provide a principal data set of principal objects and another data set of other data objects;
instantiating a first engine to perform actions including:

associating one or more principal objects with one or more other objects that are selected as potential matches to the one or more of the principal objects; and identifying each match and non-match of the one or more of the selected other objects with their associated principal object; and instantiating a second engine to train and employ a ranker to identify a matched other object that is top-ranked in similarity by its association with the one or more principal objects; and instantiating a third engine to selectively filter the other objects to rank each matched other object higher than other objects associated with a same principal object; and employing geolocation information from a Global Positioning System (GPS) device at a client computer to determine one or more features that are included in a display of the ranked other objects to a user to improve the user's understanding of the ranked other objects, wherein the features include one or more of time zones, languages, currencies, or calendar formatting that is displayed to the user of the client computer when the client computer is located at a particular geo-location.

15. The network computer of claim 14, wherein the first engine performs further actions comprising selecting the one or more principal objects based on one or more heuristics and one or more associations with the selected other objects.

16. The network computer of claim 14, further comprising employing a hardware security module to provide tamper resistant safeguarding of cryptographic information.

17. The network computer of claim 14, further comprising:
providing raw data; and
transforming the raw data into model objects that are included in one or more of the principal data set or the other data set.

18. The network computer of claim 14, wherein the first engine performs further actions comprising:
training a classifier to distinguish between matches and non-matches; and
employing the classifier to discover incorrect identification of matches.

19. The network computer of claim 14, further comprising:
grouping the other objects in the other data set with potential duplicate objects in the other data set; and
training and employing another ranker to rank potential duplicate objects based on their similarity to their associated principal duplicate object, wherein a top-ranked potential duplicate object is indicated as a duplicate object.

20. A processor readable non-transitory storage media that includes instructions for managing data, wherein execution of the instructions by one or more hardware processors performs actions, comprising:
employing a source data server to provide a principal data set of principal objects and another data set of other data objects;
instantiating a first engine to perform actions including:
associating one or more principal objects with one or more other objects that are selected as potential matches to the one or more of the principal objects; and
identifying each match and non-match of the one or more of the selected other objects with their associated principal object; and
instantiating a second engine to train and employ a ranker to identify a matched other object that is top-ranked in similarity by its association with the one or more principal objects;
instantiating a third engine to selectively filter the other objects to rank each matched other object higher than other objects associated with a same principal object; and
employing geolocation information from a Global Positioning System (GPS) device at a client computer to determine one or more features that are included in a display of the ranked other objects to a user to improve the user's understanding of the ranked other objects, wherein the features include one or more of time zones, languages, currencies, or calendar formatting that is displayed to the user of the client computer when the client computer is located at a particular geo-location.

* * * * *